(12) United States Patent
Nanni et al.

(10) Patent No.: US 6,798,914 B1
(45) Date of Patent: Sep. 28, 2004

(54) NEURAL-NETWORK-BASED METHOD OF IMAGE COMPRESSION

(75) Inventors: Richard A. Nanni, Benzonia, MI (US); Gerald Abraham, Benzonia, MI (US)

(73) Assignee: Galaxy IP Source, LLC, Timonium, MD (US)

( * ) Notice: Subject to any disclaimer, the term of this patent is extended or adjusted under 35 U.S.C. 154(b) by 0 days.

(21) Appl. No.: 09/565,372

(22) Filed: May 5, 2000

Related U.S. Application Data

(60) Provisional application No. 60/133,126, filed on May 7, 1999.

(51) Int. Cl.[7] .................................................. G06K 9/36
(52) U.S. Cl. ...................................................... 382/232
(58) Field of Search ................................. 382/155–162, 382/164–166, 181, 187, 226, 227, 232, 233; 341/77, 143; 375/242, 243, 245, 254; 395/1, 2.11, 2.91, 2.94, 2.95, 10–11, 20–23, 601, 606, 793, 804

(56) References Cited

U.S. PATENT DOCUMENTS

| | | | |
|---|---|---|---|
| 5,003,299 A | 3/1991 | Batson et al. | |
| 5,005,206 A | 4/1991 | Naillon et al. | |
| 5,041,916 A | 8/1991 | Yoshida et al. | |
| 5,068,644 A | 11/1991 | Batson et al. | |
| 5,163,111 A | * 11/1992 | Baji et al. | ...................... 395/22 |
| 5,200,816 A | 4/1993 | Rose | |
| 5,204,665 A | 4/1993 | Bollman et al. | |
| 5,285,297 A | 2/1994 | Rose et al. | |
| 5,313,534 A | 5/1994 | Burel | |
| 5,343,554 A | * 8/1994 | Koza et al. | ................... 395/13 |
| 5,426,745 A | * 6/1995 | Baji et al. | ................... 395/375 |
| 5,670,986 A | 9/1997 | Leak | |
| 5,673,065 A | 9/1997 | DeLeeuw | |
| 5,764,357 A | 6/1998 | Dockser | |
| 5,799,111 A | 8/1998 | Guissin | |
| 5,812,700 A | 9/1998 | Fang et al. | |
| 5,841,904 A | 11/1998 | Sugiura | |
| 5,872,864 A | 2/1999 | Imade et al. | |
| 5,898,794 A | 4/1999 | Sonohara et al. | |
| 6,128,346 A | * 10/2000 | Suarez et al. | ................ 375/254 |

* cited by examiner

*Primary Examiner*—Jose L. Couso
(74) *Attorney, Agent, or Firm*—McGuireWoods LLP

(57) ABSTRACT

A method for compressing images uses artificial intelligence and neural-network-based techniques to convert digital image data into symbolic data. The symbolic data is then further compressed using, for example, run-length-limited coding. The result is compressed data that represents the original image data at a high compression ratio. Such high compression ratios are useful, for example, in medical diagnostic and high-definition television applications.

7 Claims, 4 Drawing Sheets

|   | K | M | Y | C |   |
|---|---|---|---|---|---|
| K | □ | 🔔 | ❄ | 👌 | K |
|   | □ | 🔔 | ❄ | 👌 | M |
|   | ● | 🔔 | ❄ | ❄ | Y |
|   | ● | 🔔 | ❄ | ☺ | C |
| M | ● | ☞ | ☞ | = | K |
|   | ● | ☞ | ☞ | = | M |
|   | ● | ☞ | ♑ | = | Y |
|   | ● | ☞ | ♑ | = | C |
| Y | ✋ | ☪ | ☠ | 🔔 | K |
|   | ✋ | ☪ | ☠ | 🔔 | M |
|   | ✋ | ☪ | ☹ | = | Y |
|   | 💣 | ☪ | ☹ | = | C |
| C | ✝ | ✠ | ❖ | ♌ | K |
|   | ✝ | ✠ | ❖ | ♌ | M |
|   | ✝ | ✠ | & | ♌ | Y |
|   | ✝ | ✠ | & | ♌ | C |

Figure 4

NEURAL-NETWORK-BASED METHOD OF IMAGE COMPRESSION

RELATED APPLICATION

Priority is claimed from U.S. Provisional Patent Application No. 60/133,126, entitled "Neural-Network-Based Method of Image Compression," filed May 7, 1999, which is incorporated herein by reference.

FIELD OF THE INVENTION

The invention relates to the field of image compression. More specifically, the invention relates to a technique for compressing images using neural-network-based artificial intelligence methods.

BACKGROUND OF THE INVENTION

Image compression techniques are useful in many applications, including picture and video communications, picture and video storage and image analysis. Many prior-art techniques exist for performing such compression.

Compression techniques fall into two general categories, lossy and lossless. In lossy compression, images may be compressed into very efficient formats. However, the cost of doing so is a loss of information incurred in performing the compression. This may result in a reconstructed image not having all the features of the original image.

In lossless compression, as the name implies, all information is retained when the image is compressed. However, in prior art techniques, the compression ratios (i.e., the ratio of the amount of data prior to compression to that after compression) achieved are generally not nearly as great as those achieved using lossy techniques. Typically, lossless compression ratios are 4:1 or less.

Prior-art image compression techniques include JPEG, wavelet-based techniques and fractal-based techniques. The problem with such techniques is that in order to get the compressed image data small enough to be of practical use, fine details are lost. While this is fine for some applications, in which fine details are not necessary, it is unacceptable for other applications, for example, remote diagnosis using x-ray images, in which all details are necessary.

It would, thus, be desirable to have a lossless compression algorithm which is also efficient (i.e., provides high compression ratios).

OBJECTS AND SUMMARY OF THE INVENTION

It is an object of the invention to provide such an algorithm, being both lossless and highly efficient.

It is an object of the invention to provide a neural-network-based technique for compressing images.

It is an object of the invention to provide a technique for compressing x-ray and other diagnostic images so that they may be reconstructed without loss of detail.

These and other objects are accomplished by the techniques of the present invention. The inventive compression method is an artificial-intelligence-based approach that uses neural networks and a look-up table (LUT). By saving the information on the edges of an image, the algorithm symbolically represents portions of the image using the LUT. The look-up table is constructed "on the fly", as the input image data is scanned in. Symbols from the LUT, when used to represent the image, are highly repetitious, and they are compressed using an additional encoding technique, like run-length-limited (RLL) coding. The algorithm replaces repeating strings of one or more characters of an input stream with n-bit symbolic codes in an output stream. The inventive technique is capable of providing compression ratios of 100:1 or more, while allowing reliable image reconstruction.

BRIEF DESCRIPTION OF THE DRAWINGS

The above and other objects, features and advantages of the present invention will become more apparent in the following description when taken in conjunction with the accompanying drawings in which preferred embodiments of the present invention are shown by way of illustrated example and in which:

FIG. 4 depicts an exemplary symbol mapping table.

DETAILED DESCRIPTION OF THE PREFERRED EMBODIMENTS

Figure 1:
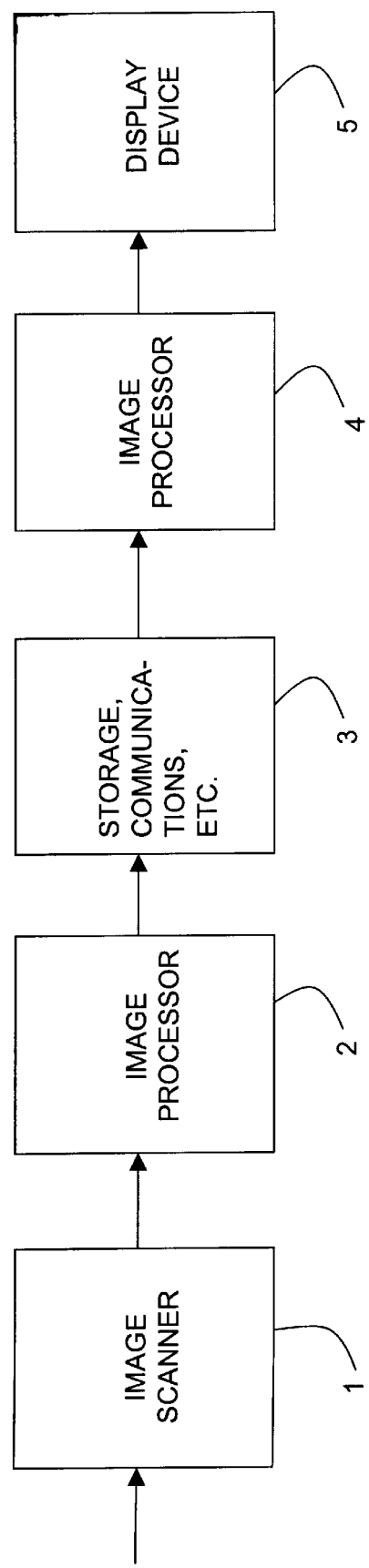
FIG. 1 is a block diagram representing an overall system in which the inventive techniques may be used.

The setting of the invention is a system for scanning and reproducing images. An image scanning device 1, which may be, but is not limited to, an image scanner, receives or generates digital image data. The digital image data is fed to an image processor 2, where the image is data undergoes compression according to the inventive method. The compressed data is stored and retrieved, transmitted and received, etc., 3. The resulting compressed data is fed into image processor 4, which may be the same as or different from image processor 2, where it is decompressed. The decompressed data is then provided to a suitable display device 5.

The inventive method is directed toward a 3D matrix encoding method, which is a type of variable-length coding. To illustrate the advantages of such variable-length coding, consider an ASCII file encoded as a sequence of fixed-length 8-bit codes; for example, the letter A is encoded as 01000001 ($41_{16}$), and the letter Z is encoded as 01011010 ($5A_{16}$). It is well-known that in the English language, the letter A occurs much more frequently than the letter Z; therefore, if A is encoded using a short code, say 011, and Z is encoded using a longer code, say 0111111, then the average number of bits used to represent each letter will be reduced, and hence, so will the number of bits needed to represent a file.

One of the most common and efficient methods for performing such variable-length coding is Huffman coding. In Huffman coding, symbol (e.g., a letter of the alphabet) frequencies, expressed as probabilities, are used to create a set of codes for representing the symbols, with the shortest codes being assigned to the most frequent symbols. The drawbacks to Huffman coding are: (1) it requires two passes over a file, one to determine the symbol frequencies and one for the actual encoding; and (2) the bit-width manipulation required of the encoded representation is computationally more expensive than byte-oriented manipulation.

These drawbacks are addressed by the inventive method. The first is addressed by assuming a standard symbol frequency distribution and bit code set. The second is addressed by encoding each line in an image segment separately and reducing it to its simplest binary symbolic format.

Figure 2:
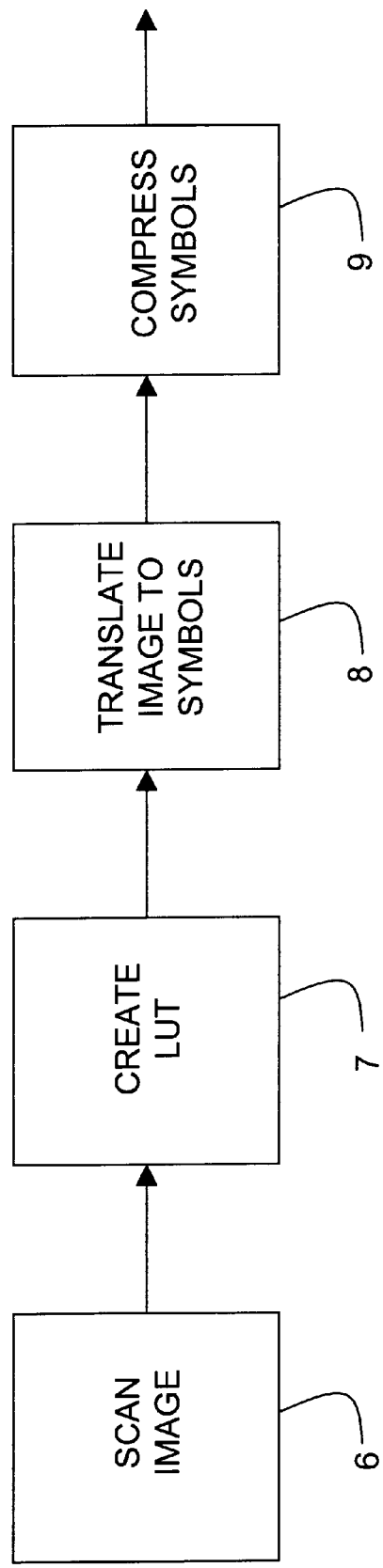
FIG. 2 depicts a flowchart of the compression algorithm of the inventive technique.

As shown in FIG. 2, the inventive method first generates image data 6. The image data is used to create a LUT 7 and, simultaneously, is translated into code symbols 8. The resulting symbols are then fed to a compression algorithm 9, where repetitive information is further encoded to reduce the size of the resulting encoded image data. This is especially important, noting that encoding each line in an image segment separately may actually expand the size of the image data by a factor of three or more; however, the expanded data is replete with repetitive information and, thus, lends itself to further encoding. Symbol compression 9 may, for example, be a RLL encoding step.

For example, the binary string 0000111000000001110000 can be described as a sequence and can be encoded as 4W-3B-8W-3B-4W, which can be further reduced, for example, to a symbolic sequence, like ▨◆▢♫❖.

One of the inventive features of the method is the use of codes generated by an artificial-intelligence-based 3D matrix, which are interpreted by neural-network-based code symbolics; that is, these techniques are used to perform pattern recognition and encoding. Because of this, files may be encoded in a single pass and written in a highly-condensed symbolic format. In essence, the algorithm replaces repeating strings of one or more characters in an input stream with n-bit symbolic codes in an output stream. Since the codes are much shorter than the strings they represent, dramatic file size reduction is possible.

The workings of the algorithm depend on three objects: a charstream, a code stream and a string table. During encoding, the charstream is input, and the code stream is output. The string table is used to store character strings and their corresponding symbols and is used in both encoding and decoding to convert strings to symbols or symbols to strings.

A unique feature of the present method is that the string table is constructed "on the fly", by both the encoder and the decoder, as the input (image) stream is being scanned, and it is unique for each image. Unlike Huffman encoding, only a single pass over the input data is required, and the table does not need to accompany the encoded representation of the data as it is embedded in a header file of an image to be stored, communicated, etc.

Assuming n-bit character codes, the string table uses N-bit encoding codes, where N>n. For example, if each charstream consists of 8-bit bytes per channel, the encoder uses 12-bit encoding codes for each channel. This allows a string table with 4,096 entries for each channel, red, green and blue, in a color image system. This is indexed by symbols with values in the range 0 . . . 4,095 for each channel. The table for each channel is initialized with all one-character strings, which are assigned the first $2^n$ codes, 0 . . . $2^n$–1. This corresponds to all 8-bit ASCII characters with code values of 0 to 255 (one-character strings are referred to as roots). A current prefix (a string) is initialized to null.

The polysynthetic encoder reads characters one at a time. As each symbol is read, a current string is constructed. It consists of the current character appended to the current prefix. A search of the string symbolic table is made to determine if the current string is in the table. If it is not found, the current string symbol is added to the table, the symbol for the current prefix is output to the code stream, and the current prefix is set to the current character. This process is repeated for each input character until no characters remain. As a final step, the symbol for the current prefix is output.

Note that, in the example above, the symbol stream consists of a sequence of 12-bit codes. These are packed so that there are no unused padding bits in the symbol stream. Furthermore, low-order code bits are placed in the low-order bits of the next available stream byte.

Figure 4:
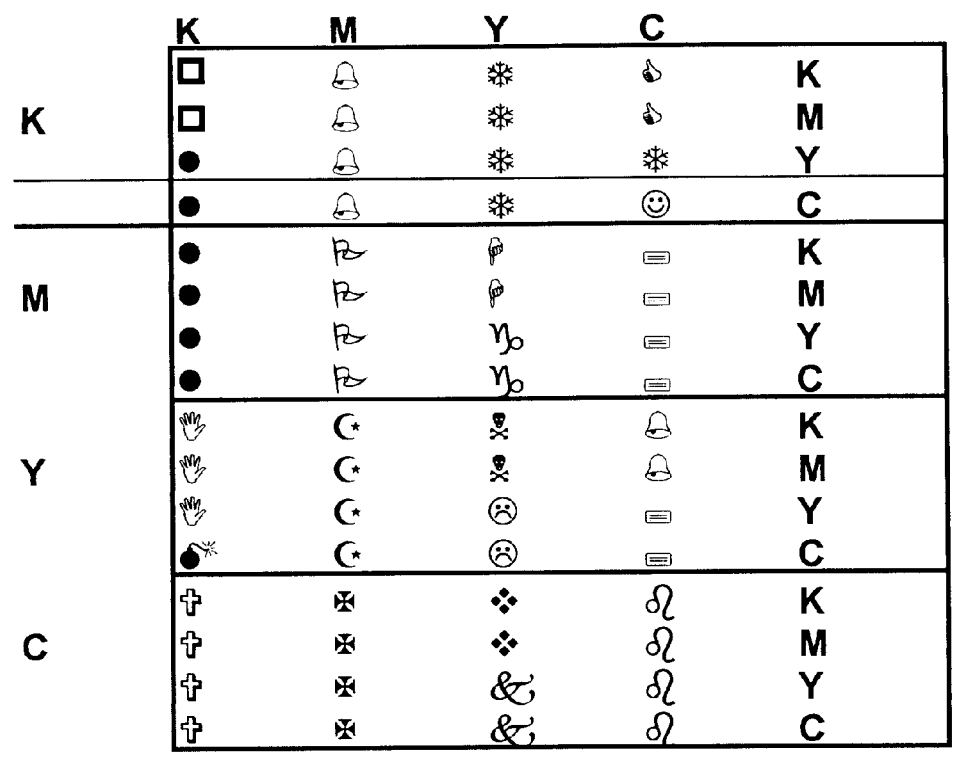

For example, suppose a code is represented as KMYC-MYCKCKYM. The resulting symbol stream is laid out as follows: KMYCMYC CKYMKMYC KKMYCMYCK. This illustrates two 12-bit codes, one of which is printed in boldface. The symbol stream, which is now highly redundant, is mapped to symbol codes as shown in FIG. 4. This results in an expanded pallet map, which is then subjected to standard RLL encoding. The resulting encoded symbol map can then be run through a polysynthetic decoder, and the original edge map is overlaid using a neural network predictor, thus generating the image.

Note that, in a preferred embodiment of the invention, the neural networks used may be implemented as multi-layer backpropagation-type neural networks.

To summarize, the method detects "shorts" for pixels of the image data, reducing the pixels to numbers. These are then converted into symbols, which are, in turn, compressed by further encoding. The result is a method by which the number of bits required to represent an image is greatly reduced.

For example, a small, 160×120 pixel image was compressed using the above method. The original image data was 57 kbytes. Following the inventive method, this image was reduced in size to 0.77 kbyte, a 74:1 compression ratio.

In another trial, an 11 Mbyte x-ray image was reduced to 21 kbytes, equivalent to a 550:1 compression ratio.

Figure 3:
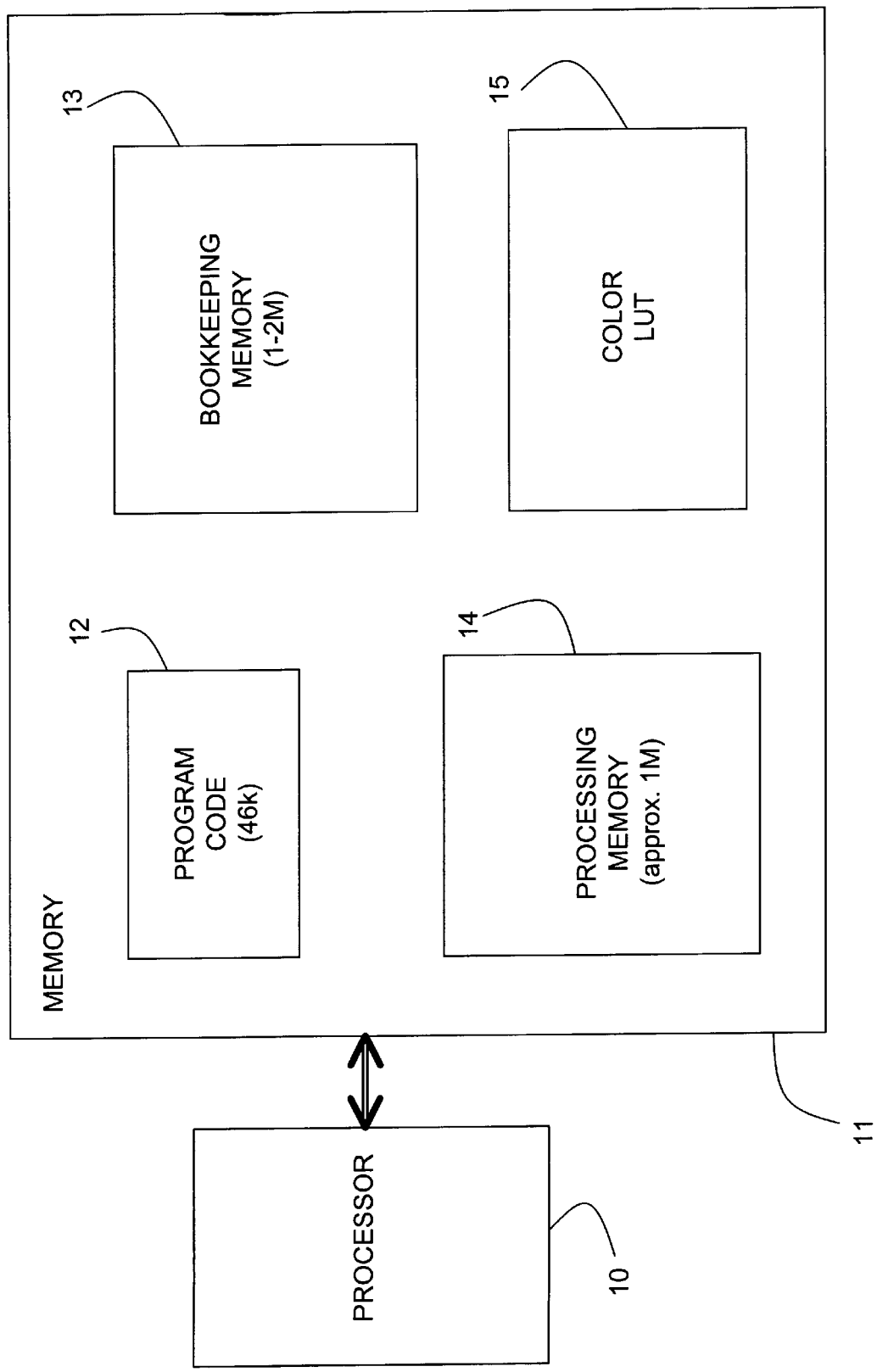
FIG. 3 is a block diagram representation of a chip set in which the inventive technique may be implemented.

FIG. 3 shows a chip set that may be used to implement the inventive algorithm. Such a chip set might be resident in, for example, image processor 2 of FIG. 1. The chip set consists of a processor 10, which may be a microprocessor or other computer device. The other component is memory 11, which may be implemented in one or several memory chips. Within memory 11 are memory blocks or chips used to store various data used in the algorithm. The program code is stored in memory 12, which has a size on the order of 46 kbytes. Processing tasks require a memory 14 of approximately 1 Mbyte. Memory 13 is provided for bookkeeping tasks required, typically on the order of 1–2 Mbytes. Finally, if color images are being compressed, a memory 15 is dedicated to storing a color LUT.

The present invention is not limited to the above-described embodiments, but various changes and modifications may be made within the true spirit and scope defined by the invention as claimed below.

What is claimed is:

1. A method of compressing image data, comprising the steps of:

scanning an image to produce digital data corresponding to said image;

using artificial intelligence symbolics and neural network pattern recognition techniques, recognizing patterns in said digital data and simultaneously creating a look-up symbol table and symbolically-encoded data;

compressing said symbolically-encoded data to form compressed data;

processing said compressed data;

decompressing said compressed data to form decompressed symbolic data;

using said look-up symbol table, recovering digital image data from said decompressed symbolic data; and providing said recovered digital image data to a display device.

2. A method as claimed in claim 1, wherein said step of processing comprises storing said compressed data.

3. A method as claimed in claim 1, where in the step of processing comprises the step of transmitting and receiving said compressed data.

4. A chip set on which an image compression method is implemented, said chip set comprising:
- a processor means for executing said image compression method; and
- memory means for use by said processor means, said memory means further comprising memory modules for storing program code implementing said image compression method, for use in executing the various steps of the method and for storing a color look-up table;
- wherein said program code memory contains a module for creating a look-up table based on recognition of patterns in image data and for simultaneously symbolically encoding image data using artificial-intelligence-based and neural-network-based techniques and a module for further compressing said symbolically encoded image data.

5. A system for scanning, storing, retrieving and displaying images, comprising:
- a scanning device;
- an image processor for compressing digital image data generated by said scanning device and for decompressing compressed digital image data, comprising a chip set containing:
  - a processor means for executing an image compression method on said digital image data and for executing an inverse, decompression method on compressed digital image data; and
  - memory means for use by said processor means, said memory means further comprising memory modules for storing program code implementing said image compression method and its inverse decompression method, for use in executing the steps of the methods and for storing a color look-up table;
  - wherein said program code memory contains a module for creating a look-up table based on recognition of patterns in image data and for simultaneously symbolically encoding image data using artificial-intelligence-based and neural-network-based techniques; a module for further compressing said symbolically encoded image data; a module for decompressing compressed symbolically encoded image data; and a module for decoding the decompressed symbolically encoded image data, based on said look-up table;
- means for storing and retrieving compressed digital image data; and
- means for displaying decompressed image data as a reconstructed image.

6. A system according to claim 5, wherein said neural-network-based techniques include the use of a multi-layer backpropagation-type neural network.

7. A method of compressing image data comprising the steps of:
- scanning an image to produce digital data corresponding to the image;
- creating a look up table using the image data and simultaneously translating a binary stream of the image data into encoded symbolic data, the encoded symbolic data having a known standard symbolic frequency distribution and bit code set;
- compressing the encoded symbolic data to compressed symbolic data;
- decompressing the compressed encoded symbolic data to form decompressed symbolic data;
- converting the decompressed symbolic data into digital image data by associating the decompressed symbolic data with the look up table; and
- providing the recovered digital image data to a display device.

* * * * *